(12) United States Patent
Hurley

(10) Patent No.: US 11,203,098 B2
(45) Date of Patent: Dec. 21, 2021

(54) TORQUE TOOL

(71) Applicant: Michael Hurley, East Palo Alto, CA (US)

(72) Inventor: Michael Hurley, East Palo Alto, CA (US)

( * ) Notice: Subject to any disclaimer, the term of this patent is extended or adjusted under 35 U.S.C. 154(b) by 266 days.

(21) Appl. No.: 16/558,005

(22) Filed: Aug. 30, 2019

(65) Prior Publication Data

US 2020/0078910 A1  Mar. 12, 2020

Related U.S. Application Data

(60) Provisional application No. 62/728,711, filed on Sep. 7, 2018.

(51) Int. Cl.
*B25B 13/48* (2006.01)
*B25B 13/06* (2006.01)
*F16B 23/00* (2006.01)

(52) U.S. Cl.
CPC .......... *B25B 13/481* (2013.01); *B25B 13/065* (2013.01); *F16B 23/0061* (2013.01)

(58) Field of Classification Search
CPC .................................................. B25B 13/065
USPC ......................................................... 81/121.1
See application file for complete search history.

(56) References Cited

U.S. PATENT DOCUMENTS

| 8,752,455 B1* | 6/2014 | Taylor, Jr. | B25B 13/06 81/185 |
| 2004/0035260 A1* | 2/2004 | Adkison | B25B 13/48 81/124.2 |
| 2004/0194585 A1* | 10/2004 | Clark | B25B 13/06 81/124.2 |
| 2010/0282030 A1* | 11/2010 | Youtsey | B25B 13/48 81/124.2 |

OTHER PUBLICATIONS

Bosch 18134 Oxygen Sensor; For sale since Jul. 1, 2016 at; https://www.amazon.com/Bosch-18134-Oxygen-Fitment-Infiniti/dp/B01HTKX33O/—Last Accessed on Jul. 22, 2021 (Year: 2021).*

* cited by examiner

*Primary Examiner* — David B. Thomas
*Assistant Examiner* — Jonathan G Santiago Martinez
(74) *Attorney, Agent, or Firm* — PowerPatent; Bao Trao

(57) ABSTRACT

A torque tool to remove a sensor body includes a substantially circular base, the base having a substantially hexagonal interior extending away from the circular base, the circular base having an exterior that extends into an outer hexagonal body; and an elongated opening extending from a rim of the base to the hexagonal interior, wherein each tip of the hexagon interior has a corner relief.

20 Claims, 7 Drawing Sheets

TORQUE TOOL

BACKGROUND

The present invention relates to a tool to remove oxygen sensors.

Oxygen sensors are employed in most modern internal combustion engines for monitoring the by-products of combustion in order to regulate the fuel-air mixture. A properly regulated air fuel mixture is necessary to achieve clean burning of the fuel. Achieving a clean burn is especially important in an automotive engine, where strict emissions standards are difficult to meet if the fuel is not cleanly burned.

The oxygen sensor becomes less reliable with age, because physical wear and chemical contamination affect the output voltage and internal resistance of the sensor. With a failed oxygen sensor the engine will run inefficiently, taking a serious toll on the performance of the car.

In addition, operating an automobile with a failed oxygen sensor can have a significant environmental impact. The amount of air pollutants produced by the automobile will increase directly due to an unclean burn, and also indirectly due to the failure of the catalytic converter when it receives large quantities of unburned fuel. Furthermore, a failed sensor can increase fuel consumption, turning a normally efficient fuel consuming car into a gas guzzler.

When the sensor fails it needs to be replaced. The current solution is not a dedicated tool, but a standard ⅞" (22 mm) socket with an offset ratchet connection to loosen/tighten the sensor. Issues experienced with this tool may include the following. First, the process requires two hands—one to hold the tool down on the sensor and one to torque the ratchet handle due to side pressure on the socket when ratcheting is applied off-center. This can be quite awkward.

Second, the degrees of travel for the ratchet handle can be an issue. The total degree of travel available when accessing the sensor with a ratcheting system minus the total play or wiggle in the ratchet handle with no movement in socket equals the Effective degrees of travel. When working in cramped areas the user may find that you have little to no effective travel with the ratchet.

Yet another issue is that, when rotating torque is applied offset from the center (as in the existing tool) it takes more energy/torque/strength to achieve the same results than it would if the torque was applied directly over center.

SUMMARY

A torque tool is disclosed with a substantially circular base, the base having a substantially hexagonal interior extending away from the circular base, the circular base having an exterior that extends into an outer hexagonal body. The base also includes an elongated opening extending from a rim of the base to the hexagonal interior. Further, each tip of the hexagon interior (on both the extended hexagonal body or nut and the base) has a corner relief to handle sensor body with minor mechanical damage or variation.

Advantages of the tool may include one or more of the following. The relief spots are provided in each of the internal 60° corners. This allows the user to work the tool over the slightly damaged hex on the sensor. With the tool in place, the user can disconnect the sensor's electrical connector from car's wiring harness. Unlike the ⅞" box end wrench, the 1¼" (or even the 1 box end wrench/ratcheting box end is large enough to allow the electrical connector to slide through. Slide the box end wrench over the connector, sensor body, and onto the new tool. The wrench rests on the skirt/flare at the bottom of the new tool body to hold the tool in place. A second hand is no longer required. With room to remove the sensor at a premium, using the new tool with the box end will negate a wiggle experience with the old tool, thereby maximizing effective degree of travel. Now, all of the user's hand energy/torque/strength is applied directly over the center of the sensor, resulting in a less strenuous removal and installation process. If the user's tool selection is limited, the user can still use an open end, vise grip, or adjustable-jaw wrench with the new tool without the worry of rounding the corners on the sensor's hex connection. Further, the tool is more likely to stay on the sensor, as the 1 and ¼ inch hex height now more than four times taller than the original ⅞ inch height.

DESCRIPTION

Figure 1:
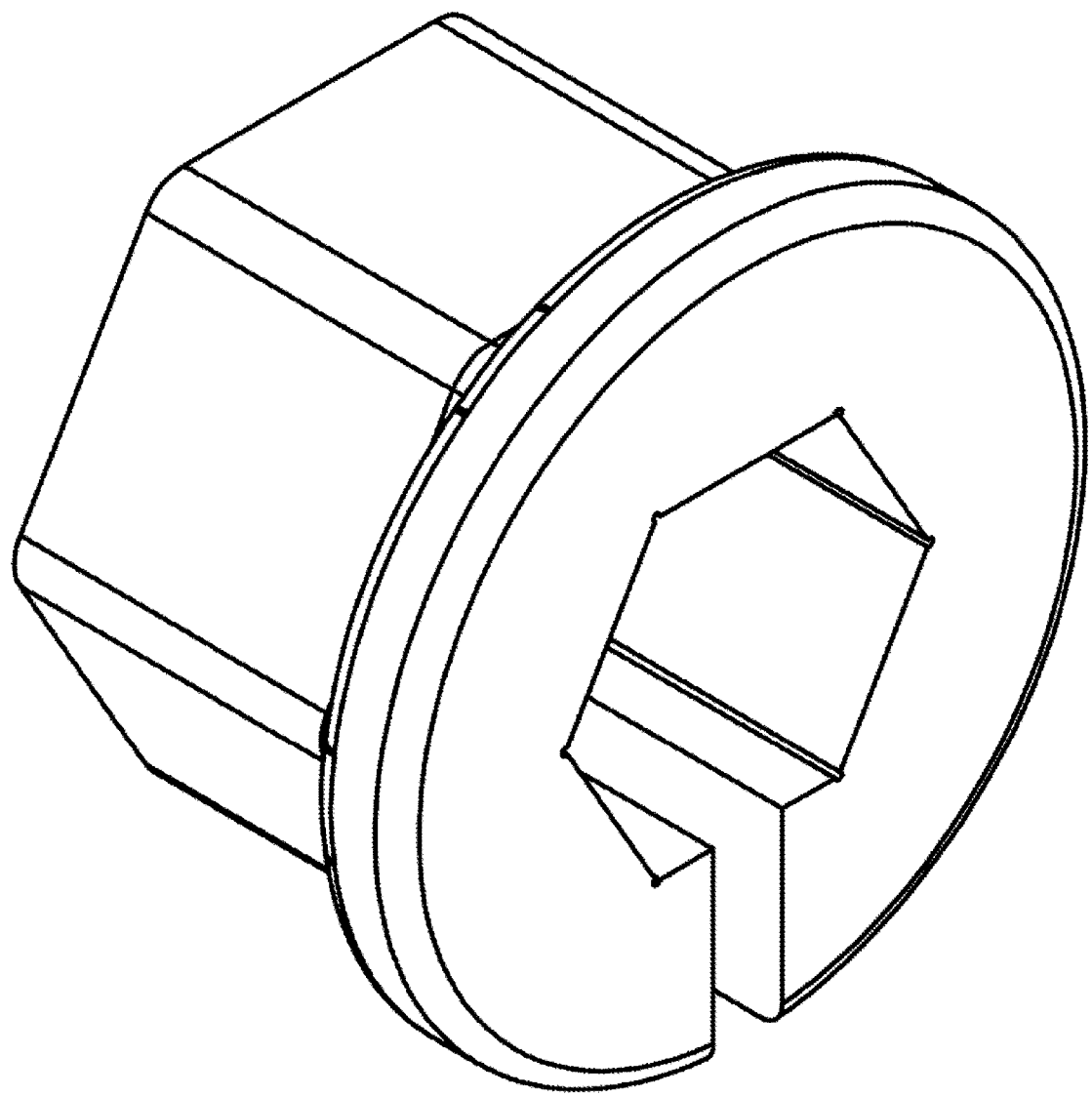
FIG. 1 shows a perspective bottom view of a torque tool.
Figure 2:
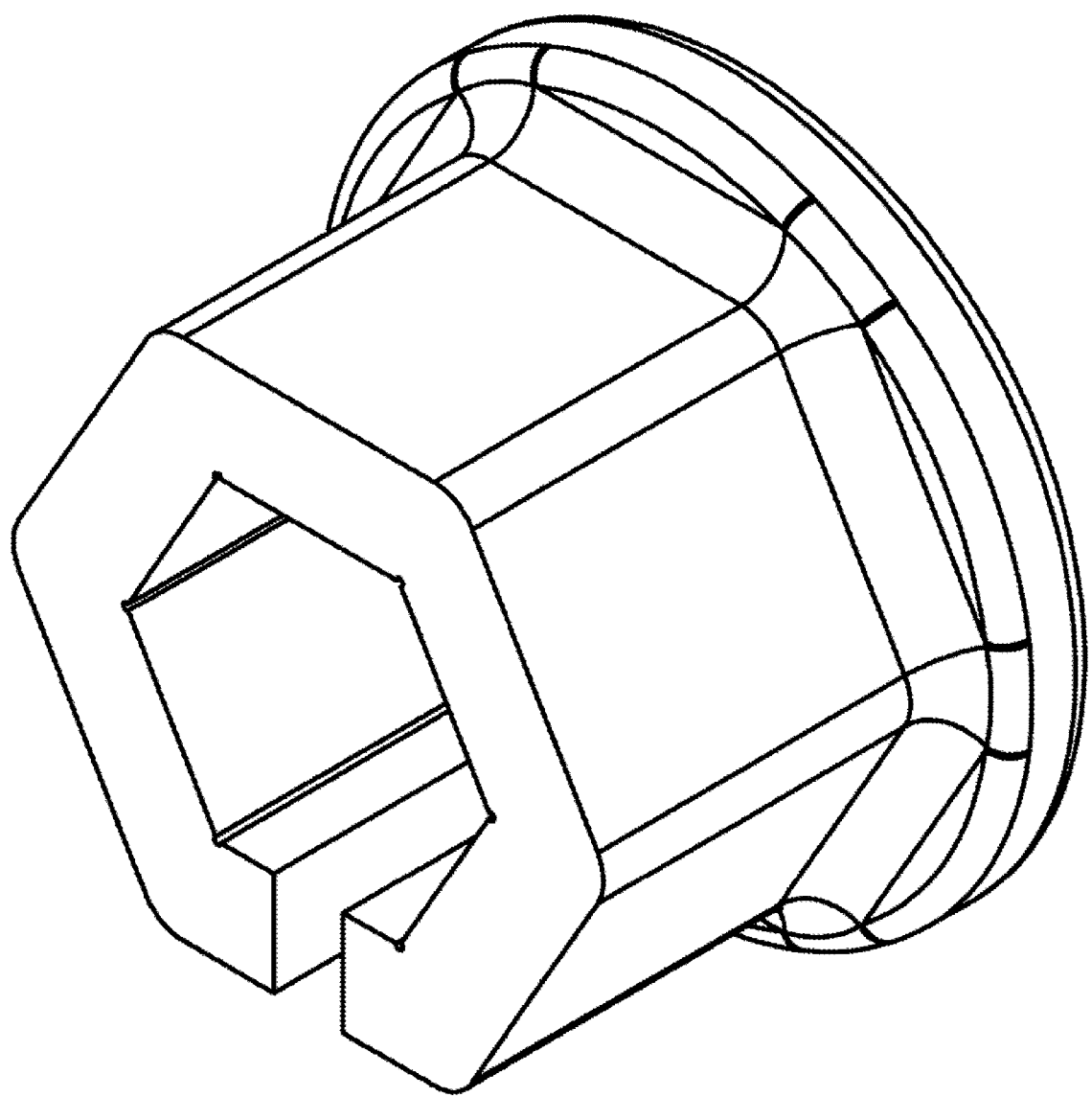
FIG. 2 shows a perspective top view of the torque tool

FIG. 1 shows a perspective bottom view of a torque tool while FIG. 2 shows a perspective top view of the torque tool. At a first end, the tool has a substantially circular shaped base with a substantially hexagonal center that extends through the other end. In particular, the torque tool's hexagonal end has a substantially elongated rectangular opening to slide the tool into the correct slot and then the tool can be rotated to remove the oxygen (O2) sensor.

The tool was designed to simplify removal and installation of O2 sensors. The sensors are located before and after each catalytic converter in the exhaust system of automobiles. With the sensor mounted in the exhaust, the cylindrical sensor body can protrude up to about three inches. It is at this end of the sensor that the wire harness (~24") exits the sensor and terminates in a connector.

The sensors require ⅞" or 22 mm open end, vise grip, or wrench with adjustable jaw or crescent wrench to tighten to tighten or remove. A standard socket cannot be used because the sensor is too long/wire harness is in the way, and the ⅞" box-end wrench cannot be used because the electrical connector at the end does not fit through a ⅞" box end. The sensor's exposure to repeated heating and cooling (expanding/retracting), combined with an already tight fit effectively mandates a tool be used for the installation and removal process. Add to that the cramped areas and odd angles encountered when accessing the sensors, and there is a high probability that an open-end wrench will slip off the sensor when removing the sensor.

Figure 3:
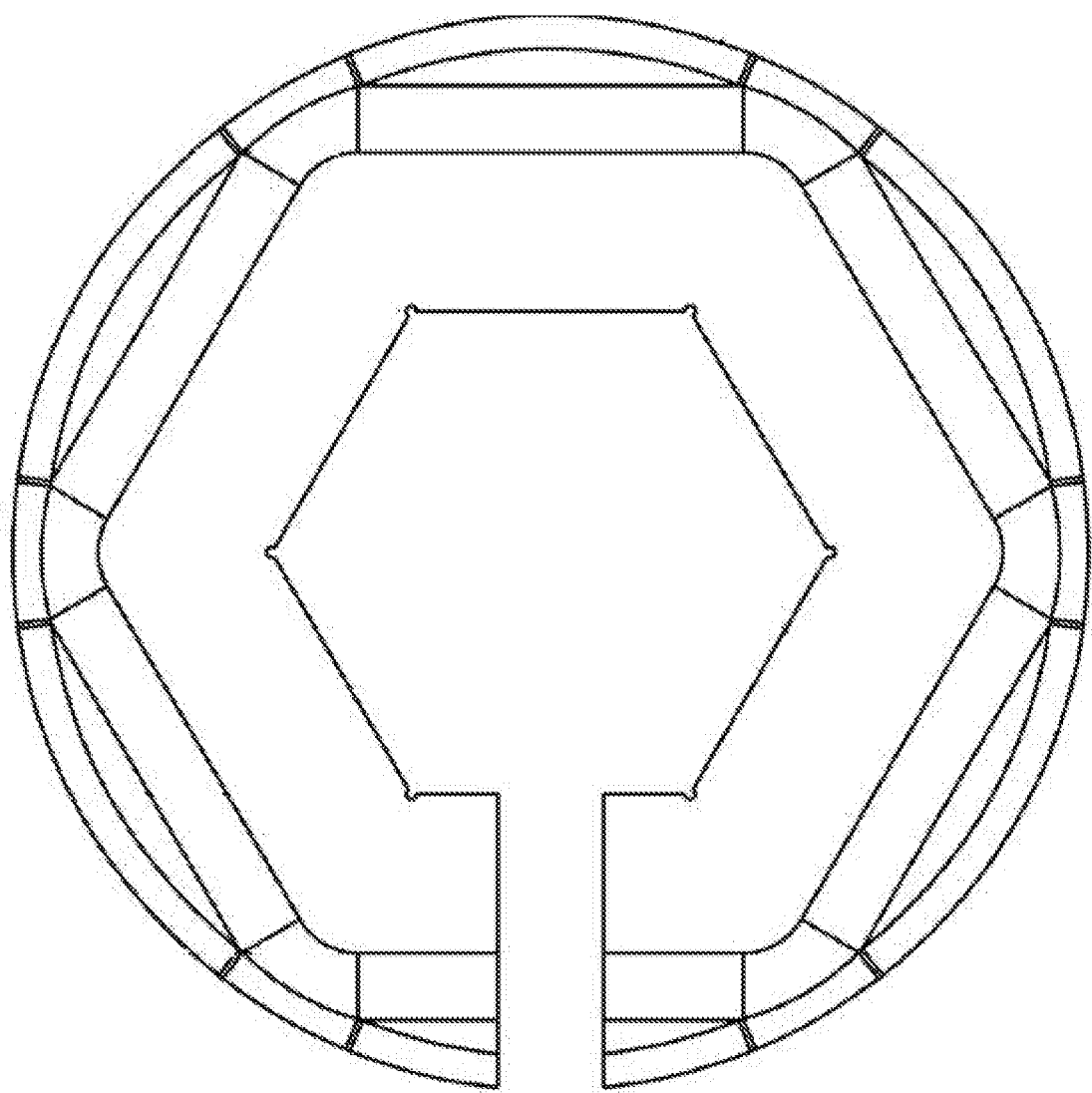
FIG. 3 shows a top view of the torque tool with six corner relief lines between internal corners of the tool.
Figure 4:
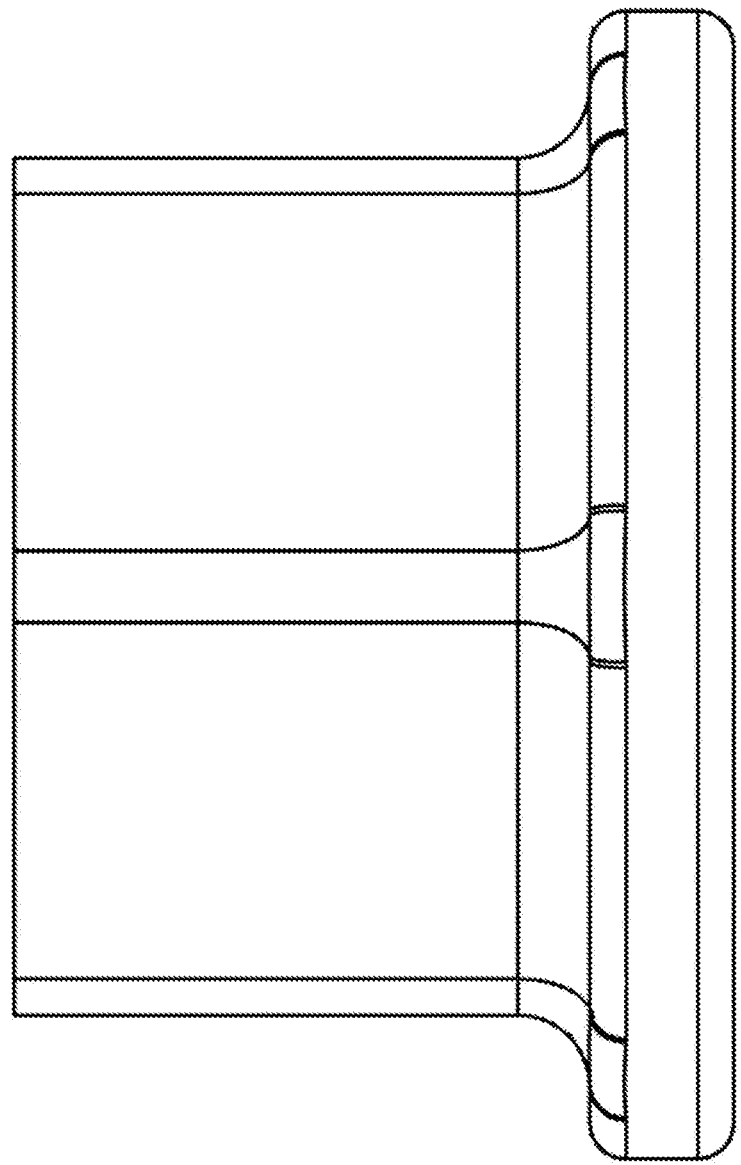
FIG. 4 shows a side view of the torque tool.
Figure 5:
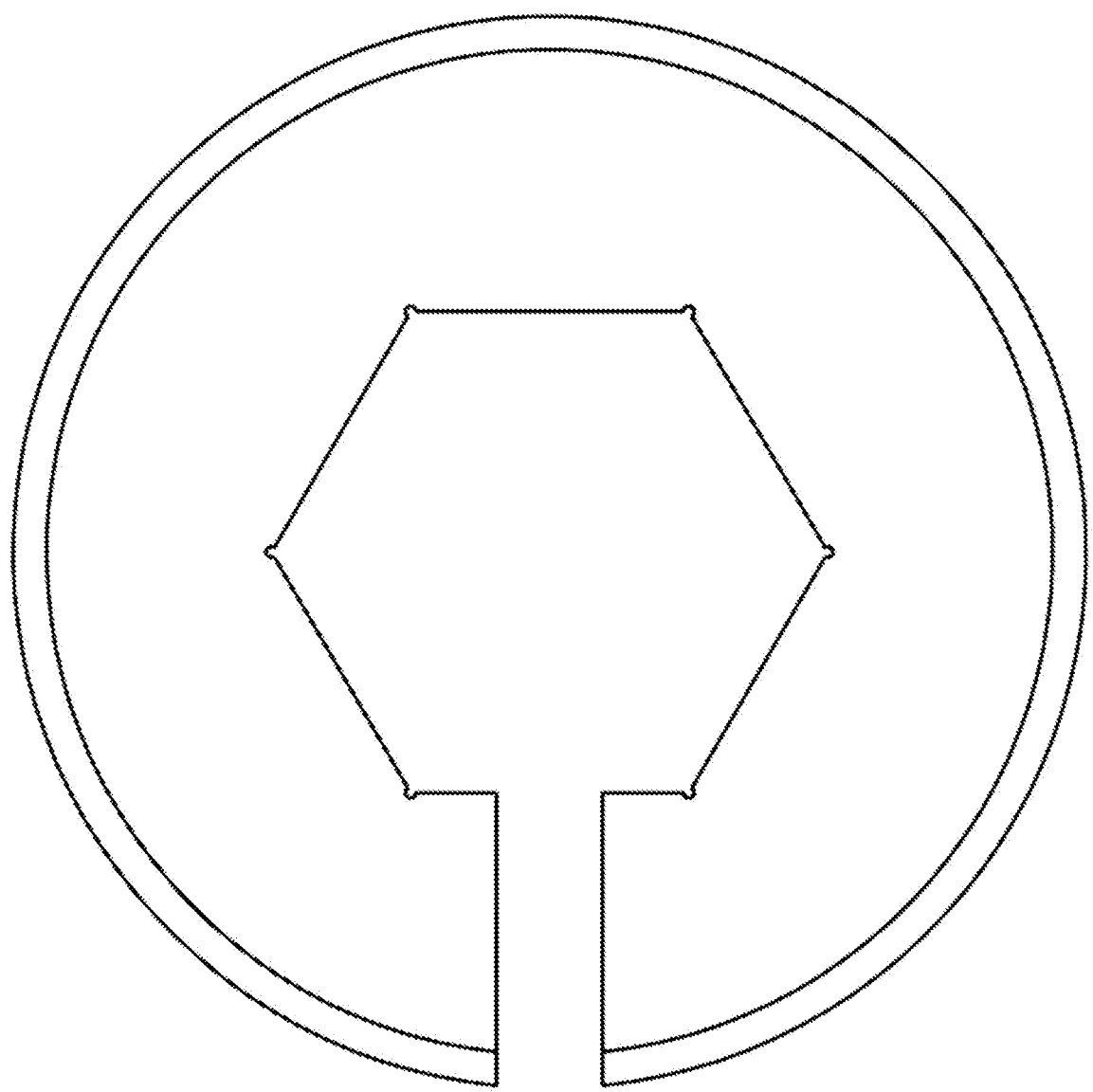
FIG. 5 shows a bottom view of the torque tool.
Figure 6:
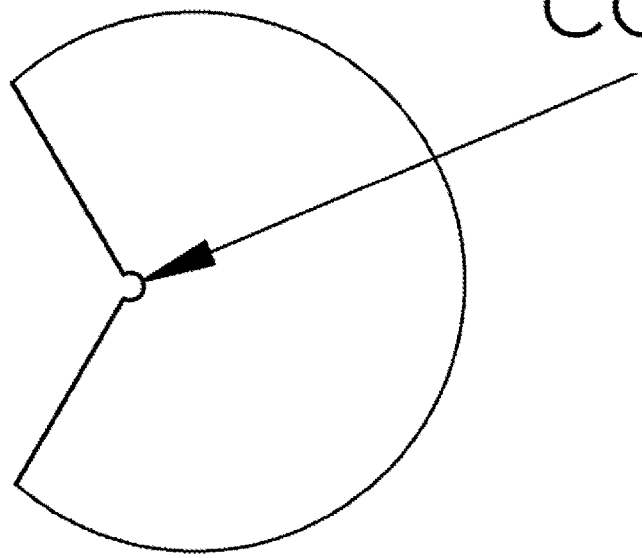
FIG. 6 shows an exemplary corner relief.
Figure 7:
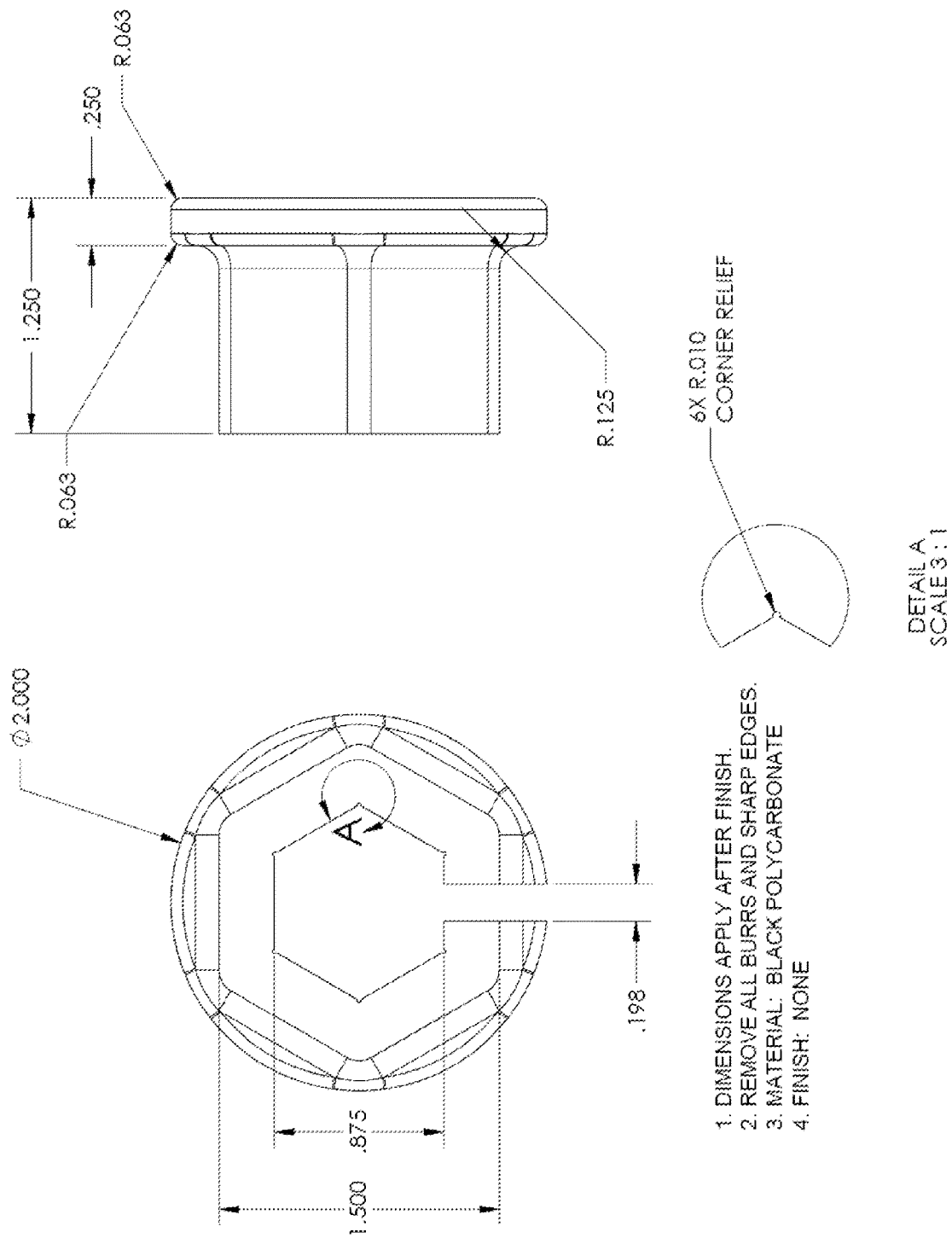
FIG. 7 shows an exemplary embodiment sizing.

FIG. 3 shows a top view of the torque tool with six corner relief lines between internal corners of the tool, while FIG. 4 shows a side view of the torque tool and FIG. 5 shows a bottom view of the torque tool. The corners of the hexagon centers have relief semicircles between the corner. This is provided to handle slightly damaged hexagonal body of the sensor. Thus, if the user previously used an open end ⅞" and the wrench had slipped off, this would damage the hex-nut, and thus six relief spots are provided, one in each of the internal 60° corners. This allows the user to work the tool over the slightly damaged hex on the sensor.

With the tool in place, the user can disconnect the sensor's electrical connector from car's wiring harness. Unlike the ⅞" box end wrench, the 1¼" (or even the 1½" model) box end wrench/ratcheting box end is large enough to allow the electrical connector to slide through. Slide the box end wrench over the connector, sensor body, and onto the new tool. The wrench rests on the skirt/flare at the bottom of the new tool body to hold the tool in place. A second hand is no longer required.

With room to remove the sensor at a premium, using the new tool with the box end will negate the wiggle experience with the old tool, thereby maximizing effective degree of travel.

Now, all of the user's hand energy/torque/strength is applied directly over the center of the sensor, resulting in a less strenuous removal and installation process.

If the user's tool selection is limited, the user can still use an open end, vise grip, or adjustable-jaw wrench with the new tool without the worry of rounding the corners on the sensor's hex connection.

While 1.25" and 1.5" are two models designed and created, other sizes are contemplated.

While preferred embodiments of the present invention have been shown and described herein, it will be obvious to those skilled in the art that such embodiments are provided by wag of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

All patents, patent applications and publications mentioned herein are hereby incorporated by reference in their entirety. Although disclosure has been provided in some detail by way of illustration and example for the purposes of clarity of understanding, it will be apparent to those skilled in the art that various changes and modifications can be practiced without departing from the spirit or scope of the disclosure. Accordingly, the foregoing descriptions and examples should not be construed as limiting.

What is claimed is:

1. A torque tool to remove a sensor body having a predetermined height after installation to a vehicle, comprising:
   a substantially circular base, the base having a substantially hexagonal interior extending away from the circular base from said base to a free distal end, the circular base having an exterior that extends into an outer hexagonal body; and
   an elongated opening extending from a rim of the base to the hexagonal interior, wherein each tip of the hexagon interior has a corner relief adapted to accept a sensor with one or more damaged corners, and wherein the tool height is equal to or less than the predetermined height.

2. The torque tool of claim 1, wherein each tip has corresponding surfaces on the extended hexagonal body or nut and the base.

3. The torque tool of claim 1, wherein the corner relief handles a sensor with a minor mechanical damage or a variation on its body.

4. The torque tool of claim 1, wherein the circular bases comprise a hex wrench connection.

5. The torque tool of claim 1, wherein the sensor body comprises an oxygen sensor body.

6. The torque tool of claim 1, comprising a curved edge on a side of the circular base.

7. The torque tool of claim 1, comprising a curved edge on each corner of the outer hexagonal body.

8. The torque tool of claim 1, comprising six relief spots, one on each of an internal 60° corners.

9. The torque tool of claim 1, comprising a plurality of relief spots, wherein each relief spot has 60° corners.

10. The torque tool of claim 1, wherein the circular base and hexagonal body comprise a height of 1.25 inch and the elongated opening comprises a width of about 0.2 inch.

11. A method to remove a sensor body, comprising:
    inserting a tool with a substantially circular base, the base having a substantially hexagonal interior extending away from the circular base, the circular base having an exterior that extends into an outer hexagonal body and an elongated opening extending from a rim of the base to the hexagonal interior, wherein each tip of the hexagon interior has a corner relief;
    receiving with the substantially hexagonal interior the sensor body having corners and wires extending from the sensor body;
    applying torque to the tool to remove the sensor body, and handling a damaged corner of the sensor body with the corner relief.

12. The method of claim 11, wherein each tip has corresponding surfaces on both the extended hexagonal body or nut and the base.

13. The method of claim 11, wherein the corner relief handles a sensor with a minor mechanical damage or a variation on its body.

14. The method of claim 11, wherein the circular bases comprise a hex wrench connection.

15. The method of claim 11, wherein the sensor body comprise an oxygen sensor body.

16. The method of claim 11, wherein the circular base and hexagonal body comprise a height of 1.25 inch and the elongated opening comprises a width of about 0.2 inch.

17. The method of claim 11, comprising forming a curved edge on a side of the circular base.

18. The torque tool method of claim 11, comprising forming a curved edge on each corner of the outer hexagonal body.

19. The method of claim 11, comprising six relief spots, one on each of an internal 60° corners.

20. The torque tool method of claim 19, wherein each relief spot has 60° corners.

* * * * *